Oct. 6, 1970   E. S. KAUFMAN   3,532,351
CONVERTIBLE DRIVE MECHANISM
Filed June 28, 1968   2 Sheets-Sheet 1

Earl S. Kaufman
INVENTOR.

BY Clarence A. O'Brien
and Harvey B. Jacobson
Attorneys

Oct. 6, 1970          E. S. KAUFMAN          3,532,351

CONVERTIBLE DRIVE MECHANISM

Filed June 28, 1968          2 Sheets-Sheet 2

Earl S. Kaufman
INVENTOR.

BY Clarence A. O'Brien
and Harvey B. Jacobson
Attorneys

United States Patent Office 3,532,351
Patented Oct. 6, 1970

3,532,351
CONVERTIBLE DRIVE MECHANISM
Earl S. Kaufman, Hudson, Ill. 61748
Filed June 28, 1968, Ser. No. 741,058
Int. Cl. B62k 13/04
U.S. Cl. 280—7.15
8 Claims

ABSTRACT OF THE DISCLOSURE

A drive mechanism for riding vehicles that can be converted from a single wheel rear drive to two wide spaced wheels and from chain drive of either situation to an Irish mail or lever drive.

---

The present invention relates to a convertible drive mechanism for a riding vehicle that can be converted from a single wheel with drive thereon to a double wide spaced pair of wheels with one of the wheels driven. There is a further provision for converting from chain drive to Irish mail or lever drive.

It is therefore an object of the invention to provide a drive mechanism that allows a riding vehicle to be converted from a two or three-wheeled vehicle to a three or four-wheeled vehicle, respectively.

It is a further object of this invention to provide a single drive wheel suspension for a riding vehicle that can be converted to a double, wide spaced wheel suspension with one of these wheels driven.

It is a further object of this invention to provide a single chain driven wheel for a riding vehicle that can be converted into a double wide spaced wheel with chain drive.

It is a still further object of this invention to provide a double, wide spaced chain wheel drive for a riding vehicle that can be converted to Irish mail or lever drive.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
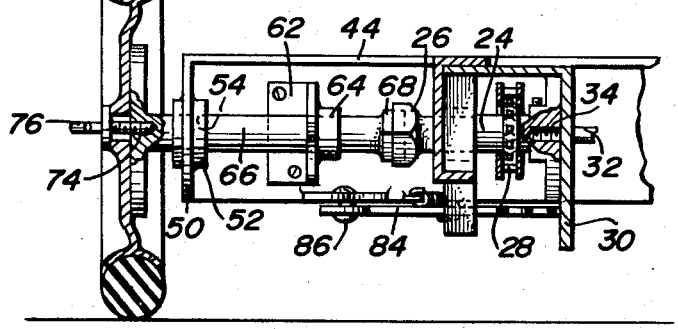
FIG. 4 is a sectional view, on an enlarged scale, of the drive mechanism taken substantially along line 4—4 in FIG. 1.
Figure 5:
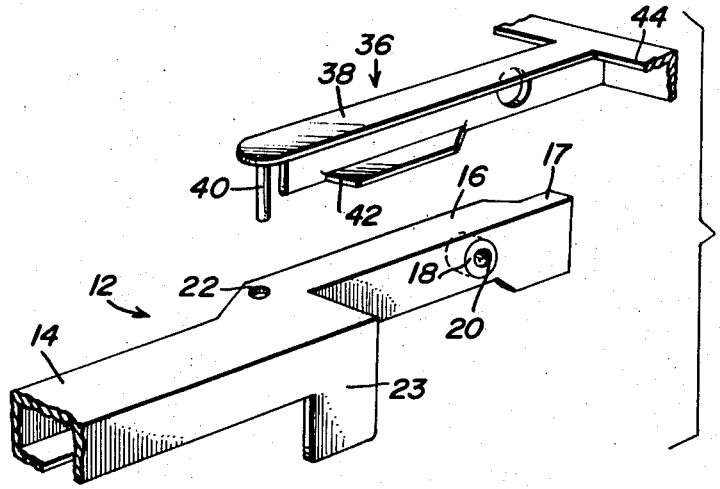
FIG. 5 is an exploded perspective view of the relationship between the main and auxiliary chassis.
Figure 6:
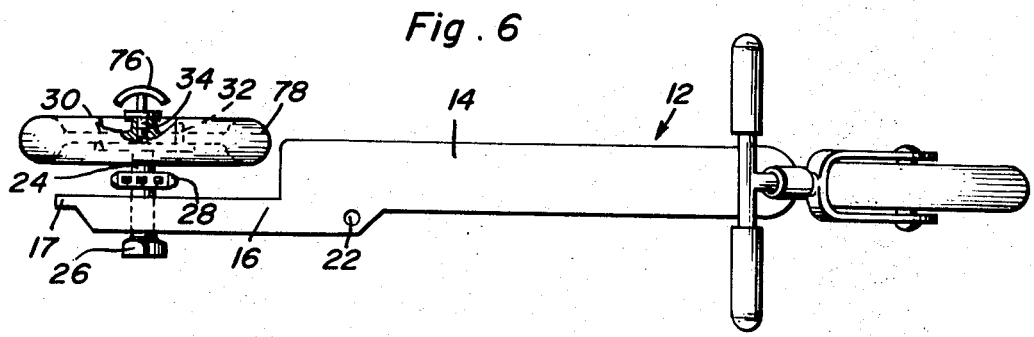
FIG. 6 is a top plan view of the drive mechanism adapted for a single wheel application.

Referring now to the drawings the numeral 10 generally designates a vehicle with a dirigible wheel at the front thereof. The dirigible wheel and its steering means and manner of attachment to the chassis 12 may be conventional and do not form a part of the invention. A seat assembly 13 may be provided and is shown supported from the chassis 12. The chassis has a main portion 14 with conventional crank pedals 15 journalled thereon, and an offset rear portion 16 which tapers to a fin-like projection 17. The chassis is generally box-shaped, as shown in FIG. 5, for rigidity. Fixed between the vertically depending sides of the chassis near the rear thereof is a bearing 18 whose opening 20 defines a horizontal axis. Aligned holes 22 are drilled through the horizontal webs of the chassis at the offset portion thereof and a depending projection 23 is coplanar with the chassis on the side opposite the hole 22, see FIG. 5. Journalled for rotation in opening 20 is shaft 24 which has a socket 26 fixed to the shaft on the outside of the offset 16. Fixed to the shaft on the other side of the offset immediately adjacent the offset is a sprocket 28, while attached to the end of the shaft near the sprocket is a crank wheel 30 with crank pin 32 thereon. This end of the shaft has a threaded opening 34 therein, see FIG. 4, for reasons to be disclosed hereinafter.

Figure 1:
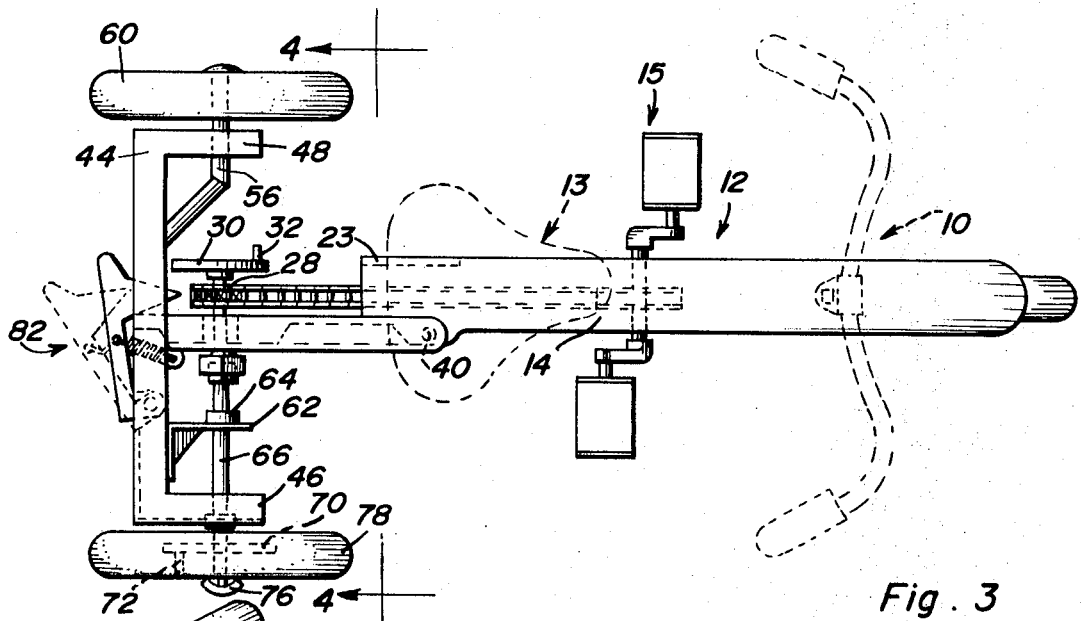
FIG. 1 is a top plan view of the invention in two wheel chain drive configuration with the auxiliary chassis in the operative position.

Auxiliary chassis 36 is formed of angle iron and is in the general form of T. A longitudinal portion 38 thereof has a depending pin 40 which is meant to be journalled in openings 22 of the main chassis, to permit arcuate movement into a position where the angular shape of the auxiliary chassis overlies the box-shape of the offset portion 16 of the chassis. Ledge 42 attached to the lower edge of portion 38 and parallel to the web of the angle iron fits snugly under the lower edge of the offset portion of the main chassis to lend rigidity thereto when 38 and 16 overlie each other and prevent relative movement therebetween so as to cause detachment, as shown in FIG. 1. Opening 37 is cut into the vertically extending web of 38 to fit over socket 26 so that the socket will extend therethrough when the vertical sides of 38 and 16 are juxtaposed. Fixed to the longitudinal portion 38, remote from the pivot point, is a cross member 44, also formed of angle iron. The cross member has laterally extending legs 46 and 48 fixed to the right and left ends of 44, respectively. The legs 46 and 48 have vertically depending portions 50 which have bearings 52 fixed thereto with openings 54 extending through the bearings and portions 50 defining a horizontal axis therethrough. Shaft 56, with bent portion 58, extends through opening 54 in leg 48 and is fixed to cross member 44 to lend stability to the shaft. Journalled for rotation on shaft 56 is wheel 60. Bracket 62, which has a bearing 64 affixed thereto, is fixed to cross member 44 adjacent and parallel to leg 46. Extending through bearing 64 and bracket 62 is opening 66 which is axially aligned with opening 54 to provide a stabilized axis of rotation for a stub shaft 65. Fixed to the end of stab shaft 65 adjacent the longitudinal portion 38 of the auxiliary chassis is lug 68 which is of a size to be received in socket 26. The other end of stub shaft 65 outside of leg 46 has crank wheel 70 attached thereto with crank pin 72 fixed thereon. The crank wheels 30 and 70 and their crank pins 32 and 72, respectively, are identical for reasons to be set forth hereinafter. The end of stub shaft 65 at crank wheel 70 has a threaded opening 74 therein, which is identical to opening 34, which receives wing stud 76 to clamp wheel 78 against crank wheel 70. The wheel 78 has an opening 80 through the web thereof to receive the crank pin 72 and thereby transmit the driving force applied therethrough.

Auxiliary chassis 36 is provided with latch mechanism 82 to hold the auxiliary chassis in the operative or overlying position of offset chassis 16. The latch lever 84 pivoted on cross member 44 at 86, with spring 88 urging the latch into a closed position as shown in phantom in FIG. 1. A detent 90 extends along the side of projection 17 of the offset portion 16 of the chassis in a wedging action to maintain the auxiliary chassis in its operative position.

When the auxiliary chassis 36 is pivotably engaged on the chassis 12 and latched into position, as shown in FIG. 1, the riding vehicle can be driven by a chain drive, wherein a chain 92 is operatively engaged with a pedal mechanism 15 to drive sprocket 28. This drives shaft 24 and transmits the power through socket 26 and lug 68 to stub shaft 65 and thence through crank wheel and pin, 70 and 72, respectively, to the wheel 78.

Figure 7:
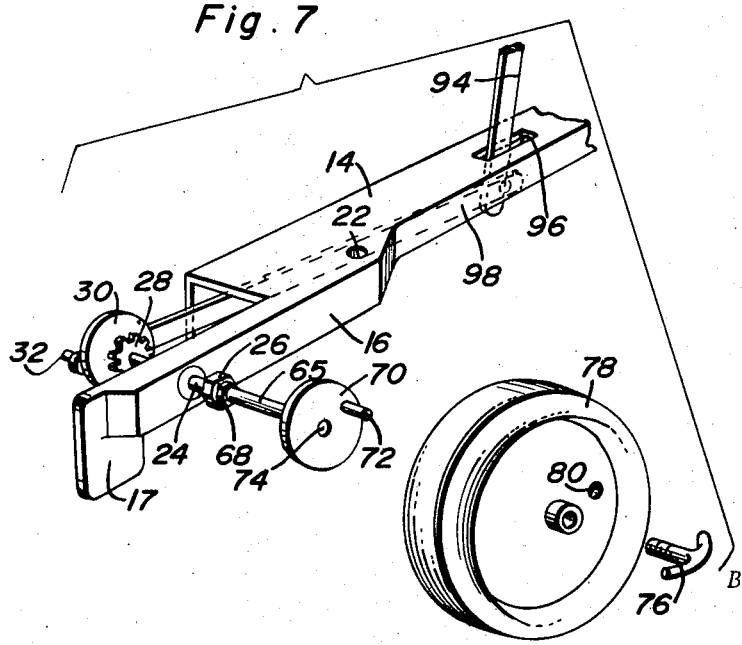
FIG. 7 is an exploded perspective view of the drive mechanism adapted for Irish mail or lever drive.

The modification of FIG. 7 shows how the vehicle is adapted to an Irish mail or lever drive. The chassis has a provision thereon for a lever 94 to be received through a slot 96 in the top of the chassis and be pivoted to the chassis. A connecting rod is pivoted to lever 94 thereby providing the traditional Irish mail actuating mechanism. An opening in the other end of rod 98 is received over crank pin 32, thereby providing the eccentric to provide a driving rotative force. This force is transmitted to the driving wheel 78 in the same manner as the chain drive mechanism. The rod 98 passes inside of depending projection 23 which retains the connecting rod on crank pin 32 without the need for a connecting means such as a lock nut or cotter pin.

Figure 2:
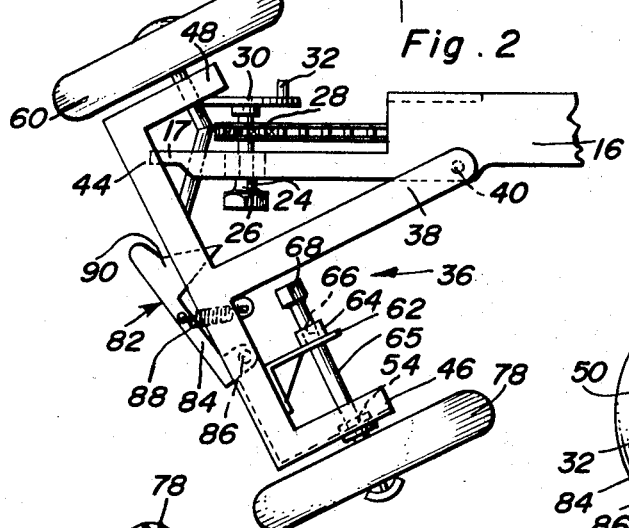
FIG. 2 is a view similar to FIG. 1 showing the auxiliary chassis member pivoted out of the operative position.
Figure 3:
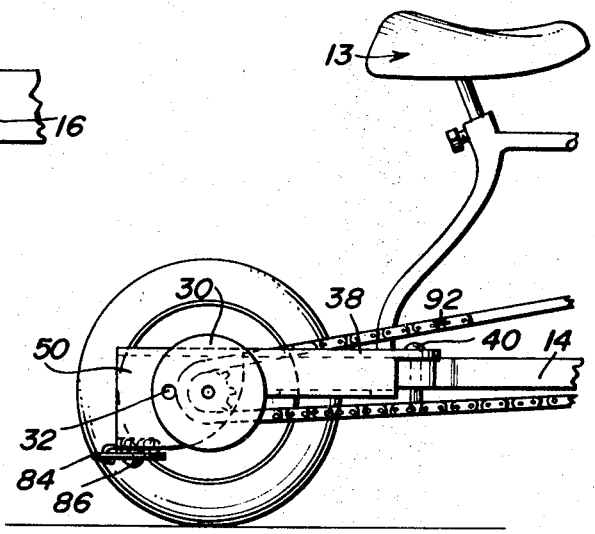
FIG. 3 is a side view of the drive mechanism of FIGS. 1 and 2.

To convert the drive mechanism to a single wheel suspension the auxiliary chassis is unlatched from the chassis and pivoted outwardly, as shown in FIG. 2, until the ledge 42 clears the underside of the chassis. The entire auxiliary chassis assembly can then be removed by lifting pin 40 clear of openings 22. Wing stud 76 is then loosened and wheel 78 removed from crank wheel and pin, 70 and 72 respectively. Since, as aforementioned, openings 34 and 74 and crank wheels 30 and 70, and crank pins 32 and 72 are identical the wheel 78 can be mounted on crank wheel 30 with crank pin 32 extending through opening 80 in wheel 78. The wheel 78 is then secured thereto by wing stud 76 received in opening 34. Thus by a simple shifting of the elements the vehicle can be changed from single wheel to double wheel rear suspension.

When the drive is converted to the single wheel configuration the chain drive is used. It should be noted that in a single wheel configuration the chain can be disconnected and the vehicle used as scooter. Similarly, when the vehicle is in the double wheel configuration, utilizing the auxiliary chassis assembly, the chain can be disconnected and the resultant vehicle used as a coaster. Also, while the power means shown in the embodiment disclosed herein is a conventional pedal means it can readily be seen that an internal combustion engine could power the chain that is received on the sprocket of the shaft that is journalled in the main chassis. Thus can be seen the complete versatility of the vehicle set forth herein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A convertible drive suspension for riding vehicles, comprising: a chassis with power means thereon, a shaft rotably journalled at the rear of the chassis said shaft having a means thereon receiving power from the power means, said shaft further having wheel receiving means at one end and a power transmitting means at the other, an auxiliary chassis detachably mounted on said chassis, said auxiliary chassis having a wheel journalled for rotation on one side thereof and a stub shaft journalled for rotation on the other side thereof, said stub shaft having means to cooperate with said power transmitting means at one end and a wheel receiving means on the other end, and a wheel detachably received on said second named wheel receiving means.

2. The device of claim 1 wherein the detachable mounting of said auxiliary chassis is a pivot point with a vertical axis, allowing the auxiliary chassis to be pivoted away from the chassis and removed therefrom.

3. The device of claim 2 wherein the first and second wheel receiving means are substantially the same so that when the auxiliary chassis is removed from the chassis, the wheel is detachable from the wheel receiving means on the other end, and a wheel detachably received on said ceiving means on said chassis.

4. The device of claim 2 wherein the auxiliary chassis has an operative position when it is pivoted into a position engaging and partially overlying the chassis and has an inoperative position when the auxiliary chassis is pivoted into a position angularly displaced to said chassis at said pivot point.

5. The device of claim 4 wherein the auxiliary chassis has means thereon to secure it to the chassis in the operative position.

6. The device of claim 5 wherein the cooperating means on said stub shaft engages the power transmitting means when the auxiliary chassis is in an operative position and disengages the power transmitting means when the auxiliary chassis is in an inoperative position.

7. The device of claim 1 wherin the power receiving means is a sprocket fixed to the shaft and a chain delivers the power thereto from said power means.

8. The device of claim 1 wherein the wheel receiving means on said shaft receives power from a reciprocating rod when said power receiving means is not used.

References Cited

UNITED STATES PATENTS

| | | | |
|---|---|---|---|
| 1,257,999 | 3/1918 | Guilder | 180—16 |
| 1,747,412 | 2/1930 | Armstrong | 180—16 |
| 1,965,197 | 7/1934 | Koch | 280—7.15 |
| 1,979,545 | 11/1934 | Heidemann | 180—16 |
| 2,660,442 | 11/1953 | Wiesner, et al. | 280—7.1 |
| 3,229,988 | 1/1966 | Mansperger | 280—7.15 |
| 3,258,273 | 6/1966 | Matthews | 280—7.15 |

BENJAMIN HERSH, Primary Examiner

M. L. SMITH, Assistant Examiner

U.S. Cl. X.R.

280—287